US012791379B2

(12) United States Patent
Okamoto

(10) Patent No.: US 12,791,379 B2
(45) Date of Patent: Nov. 10, 2026

(54) LASER PATH DISPLAY DEVICE AND STORAGE MEDIUM

(71) Applicant: FANUC CORPORATION, Yamanashi (JP)

(72) Inventor: Takashi Okamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 72 days.

(21) Appl. No.: 18/850,836

(22) PCT Filed: May 26, 2022

(86) PCT No.: PCT/JP2022/021588

§ 371 (c)(1),
(2) Date: Sep. 25, 2024

(87) PCT Pub. No.: WO2023/228365

PCT Pub. Date: Nov. 30, 2023

(65) Prior Publication Data

US 2025/0224272 A1 Jul. 10, 2025

(51) Int. Cl.
*G01J 1/42* (2006.01)
*G02B 26/10* (2006.01)

(52) U.S. Cl.
CPC .......... *G01J 1/4257* (2013.01); *G02B 26/105* (2013.01)

(58) Field of Classification Search
CPC .... G01J 1/4257; G02B 26/105; B23K 26/082
See application file for complete search history.

(56) References Cited

U.S. PATENT DOCUMENTS

| | | | | |
|---|---|---|---|---|
| 2015/0104101 | A1* | 4/2015 | Bryant | G06T 7/557 382/171 |
| 2020/0376593 | A1* | 12/2020 | Tezuka | G01J 1/4257 |

FOREIGN PATENT DOCUMENTS

| | | | |
|---|---|---|---|
| JP | 2015-196166 | A | 11/2015 |
| JP | 2018-001217 | A | 1/2018 |
| JP | 2018-001237 | A | 1/2018 |
| JP | 2019-118950 | A | 7/2019 |
| JP | 2020-194038 | A | 12/2020 |

OTHER PUBLICATIONS

International Search Report issued in PCT/JP2022/021588; mailed Aug. 16, 2022.

* cited by examiner

*Primary Examiner* — Thanh Luu
(74) *Attorney, Agent, or Firm* — Studebaker Brackett PLLC

(57) ABSTRACT

A commanded coordinate acquisition unit acquires commanded coordinates for laser light relative to a workpiece, based on command information to mirror drive devices. An actual coordinate calculation unit calculates actual coordinates of the laser light relative to the workpiece, based on a state of at least either mirrors or the mirror drive devices. A display setting unit sets each of a part of layers of a layered structure S as a display layer Ld. A path display portion 45 overlappingly displays, for the set display layers Ld, a commanded laser path T1 as a path based on a history of the acquired commanded coordinates and an actual laser path as a path T2 based on a history of the calculated actual coordinates.

19 Claims, 10 Drawing Sheets

LASER PATH DISPLAY DEVICE AND STORAGE MEDIUM

TECHNICAL FIELD

The present disclosure relates to a galvanometer scanner for forming a layered structure on a workpiece.

BACKGROUND ART

A galvanometer scanner includes, for example, mirrors and mirror drive devices. The mirrors include a first mirror and a second mirror. The mirror drive devices include a first rotation device that rotates the first mirror around a first axis line and a second rotation device that rotates the second mirror around a second axis line.

Laser light emitted from a laser light source is reflected by the first mirror and the second mirror in turn and is radiated to the surface of a workpiece. The first rotation device causes the coordinates of the laser light on the workpiece to scan in a first direction by rotating the first mirror. The second rotation device causes the coordinates of the laser light on the workpiece to scan in a second direction by rotating the second mirror. The galvanometer scanner sinters metal powder or the like as material of the workpiece in layers by scanning of the laser light to form a layered structure on the workpiece.

CITATION LIST

Patent Document

Patent Document 1: Japanese Unexamined Patent Application, Publication No. 2020-194038

DISCLOSURE OF THE INVENTION

Problems to be Solved by the Invention

If, when a layered structure is formed as described above, a desired shape or desired strength is not obtained, it is necessary to investigate the cause thereof. The present inventors noticed that, in this case, there is a possibility that an actual laser path as an actual scanning path of the laser light is disrupted, for example, by overshoot or the like due to feedback control, and the disruption causes the problem.

The present disclosure has been made in view of the above situation, and an object is to make it possible to efficiently investigate the disruption of the actual laser path.

Means for Solving the Problems

A first disclosure is a laser path display apparatus installed for a galvanometer scanner, the galvanometer scanner including mirrors and mirror drive devices driving the mirrors, and forming a layered structure on a workpiece with laser light reflected by the mirrors, the laser path display apparatus including:

a commanded coordinate acquisition unit acquiring commanded coordinates of the laser light relative to the workpiece, based on command information to the mirror drive devices;

an actual coordinate calculation unit calculating actual coordinates of the laser light relative to the workpiece, based on a state of at least either the mirrors or the mirror drive devices;

a display setting unit setting one or more layers of the layered structure as a display layer; and a path display portion overlappingly displaying, for the display layer being set, a commanded laser path as a path based on a history of the commanded coordinates acquired and an actual laser path as a path based on a history of the actual coordinates calculated.

According to the first disclosure, one or more layers of a layered structure are set as a display layer, and, for the display layer, a commanded laser path and an actual laser path are overlappingly displayed. Therefore, it is possible to, for each of the part of the layers, overlappingly display the commanded laser path and the actual laser path. Therefore, a user can easily visually confirm a deviation of the actual laser path relative to the commanded laser path on the same layer and can recognize disruption of the actual laser path based on the deviation. Therefore, the user can efficiently investigate the disruption of the actual laser path.

A second disclosure is a laser path display program causing a computer being installed for a galvanometer scanner, the galvanometer scanner including mirrors and mirror drive devices driving the mirrors, and forming a layered structure on a workpiece with laser light reflected by the mirrors, to function as:

a commanded coordinate acquisition unit acquiring commanded coordinates of the laser light relative to the workpiece, based on command information to the mirror drive devices;

an actual coordinate calculation unit calculating actual coordinates of the laser light relative to the workpiece, based on a state of at least either the mirrors or the mirror drive devices; and a display setting unit setting one or more layers of the layered structure as a display layer so as to cause a display of the computer to overlappingly display, for the display layer being set, a commanded laser path as a path based on a history of the commanded coordinates acquired and an actual laser path as a path based on a history of the actual coordinates calculated.

According to the second disclosure, it is possible to cause a computer and a display thereof to function as the laser path display apparatus of the first disclosure and obtain effects similar to those of the case of the first disclosure.

PREFERRED MODE FOR CARRYING OUT THE INVENTION

Embodiments of the present disclosure will be described below with reference to drawings. The present disclosure, however, is not limited to the embodiments below and can be appropriately changed and practiced within a range not departing from the spirit of the present disclosure.

First Embodiment

Figure 1:
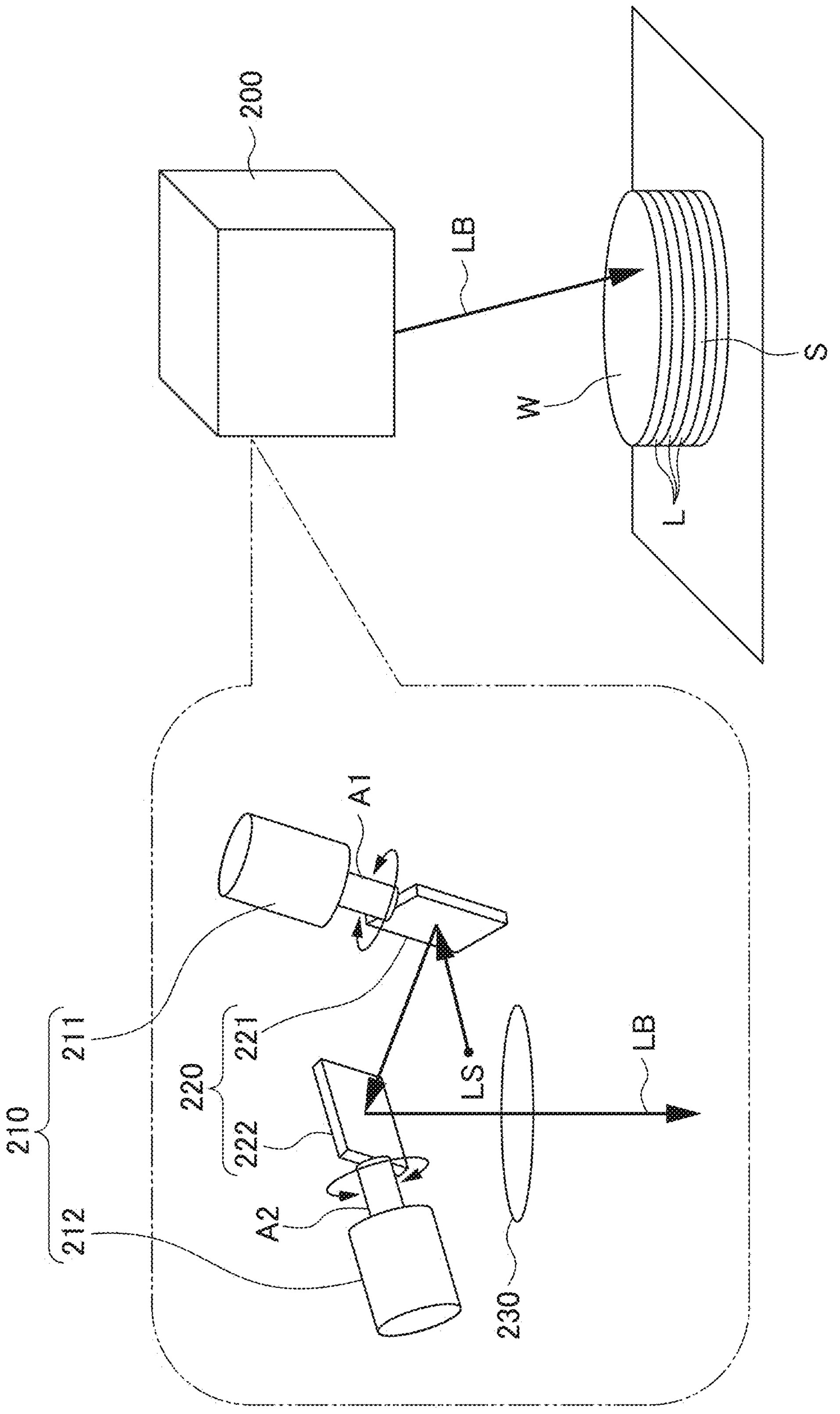
FIG. 1 is a schematic diagram showing a galvanometer scanner of a first embodiment.

As shown in FIG. 1, a galvanometer scanner 200 has mirrors 220, mirror drive devices 210, and a condenser lens 230. The mirrors 220 include a first mirror 221 and a second mirror 222. The mirror drive devices 210 include a first rotation device 211 that rotates the first mirror 221 and a second rotation device 212 that rotates the second mirror 222.

The first mirror 221 reflects laser light LB from a laser light source LS. The second mirror 222 further reflects the laser light LB reflected by the first mirror 221. The condenser lens 230 condenses the laser light LB reflected by the second mirror 222 and emits it toward a workpiece W. Hereinafter, coordinates of the laser light LB on the workpiece W will be referred to simply as "actual coordinates of the laser light LB".

Both of the first rotation device 211 and the second rotation device 212 are servomotors or the like. The first rotation device 211 causes the actual coordinates of the laser light LB to be scanned in a first direction Y by causing the first mirror 221 to rotate around a first rotation axis A1. The second rotation device 212 causes the actual coordinates of the laser light LB to be scanned in a second direction X by causing the second mirror 222 to rotate around a second rotation axis A2.

The galvanometer scanner 200 sinters metal powder or the like, which is sequentially layered as material of the workpiece W, in layers by scanning of the laser light LB to form a layered structure S on the workpiece W.

Figure 2:
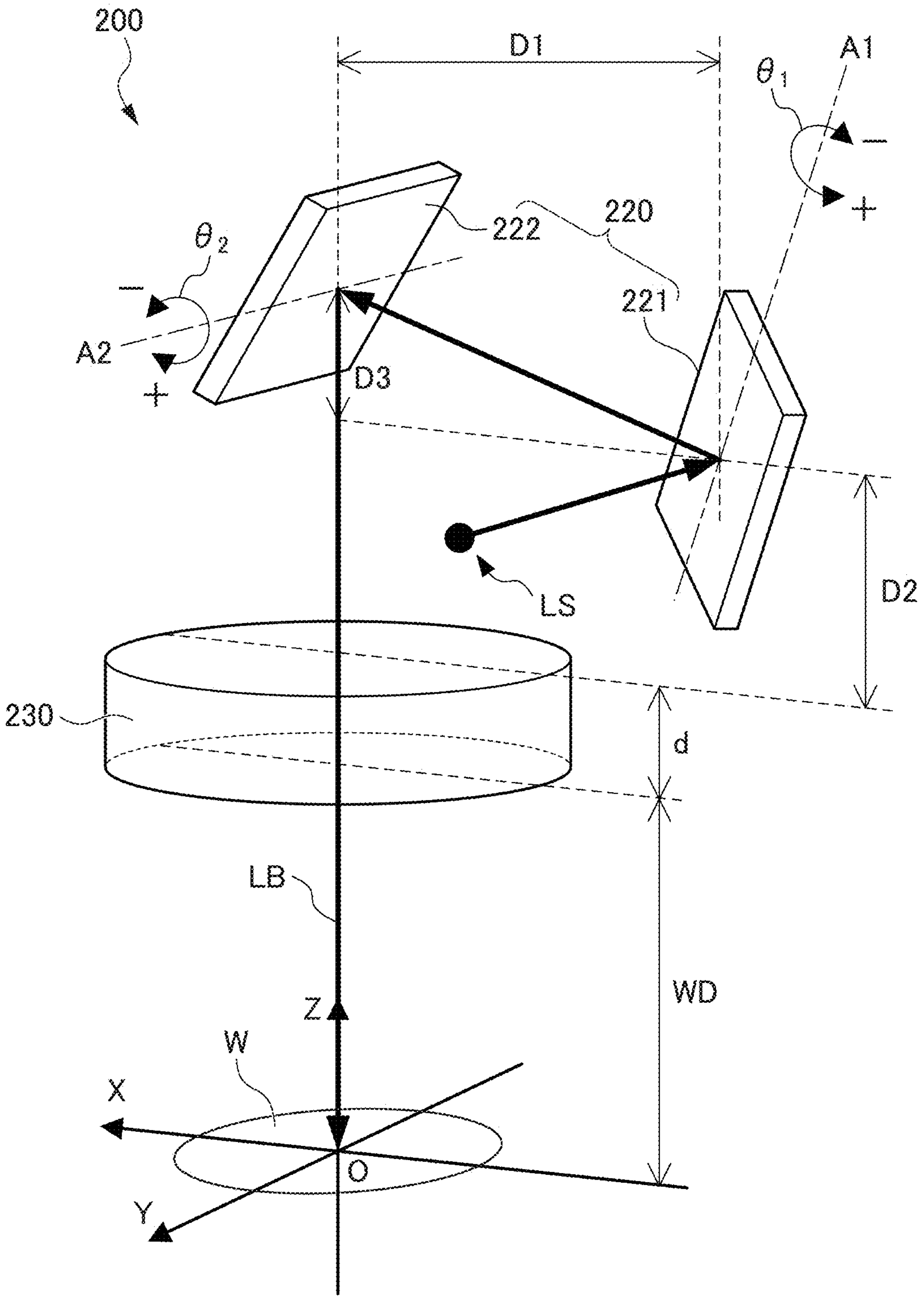
FIG. 2 is a schematic diagram showing a relationship between angles of mirrors and actual coordinates of laser light.

As shown in FIG. 2, both of the first direction Y and the second direction X are horizontal directions. The condenser lens 230 is arranged just below the second mirror 222, and the workpiece W is arranged just below the condenser lens 230.

Hereinafter, a rotation angle of the first mirror 221 from a reference angle will be represented by "$\theta_1$", and a rotation angle of the second mirror 222 from a reference angle will be represented by "$\theta_2$". Further, an inter-axial distance between the first mirror 221 and the second mirror 222 in the second direction X will be represented by "D1". Further, a distance between an incidence position of the laser light LB on the first mirror 221 and a top surface of the condenser lens 230 in an upward/downward direction Z will be represented by "D2". Further, a distance between the incidence position of the laser light on the first mirror 221 and an incidence position of the laser light on the second mirror 222 in the upward/downward direction Z will be represented by "D3". Further, the thickness of the condenser lens 230 in the upward/downward direction Z will be represented by "d". Further, the distance from the lower surface of the condenser lens 230 to the top surface of the workpiece W in the upward/downward direction Z will be represented by "WD".

In the actual coordinates of the laser light LB, "X" as a coordinate in the second direction X and "Y" as a coordinate in the first direction Y are expressed, for example, by expressions of [Formula 1] below.

[Formula 1]

$$X = D\tan 2\theta_2$$

$$Y = sqrt\left(D1^2 + D3^2\right)\tan 2\theta_1 + sqrt\left(D^2 + X^2\right)\tan 2\theta_1$$

$$\text{HERE, } D = D3 + D2 + D + WD \text{ IS ASSUMED.}$$

Hereinafter, a scan path of the actual coordinates of the laser light LB will be referred to as an "actual laser path T2". Further, hereinafter, coordinates of the laser light LB on the workpiece W in a case where the mirror drive devices 210 drive the mirrors 220 as having been instructed, in an ideal state without an error will be referred to as "commanded coordinates for the laser light LB" and a path of the commanded coordinates for the laser light LB will be referred to as a "commanded laser path T1".

An error occurs in the actual laser path T2 relative to the commanded laser path T1. Specifically, for example, overshoot or the like occurs in the actual laser path T2 due to feedback control for response delay of the mirror drive devices 210. The error described above is caused by the overshoot or the like. There is a possibility that, due to the error, a desired shape or desired strength of the layered structure S is not obtained. In order to investigate the error, a laser path display apparatus 101 shown below is installed for the galvanometer scanner 200.

Figure 3:
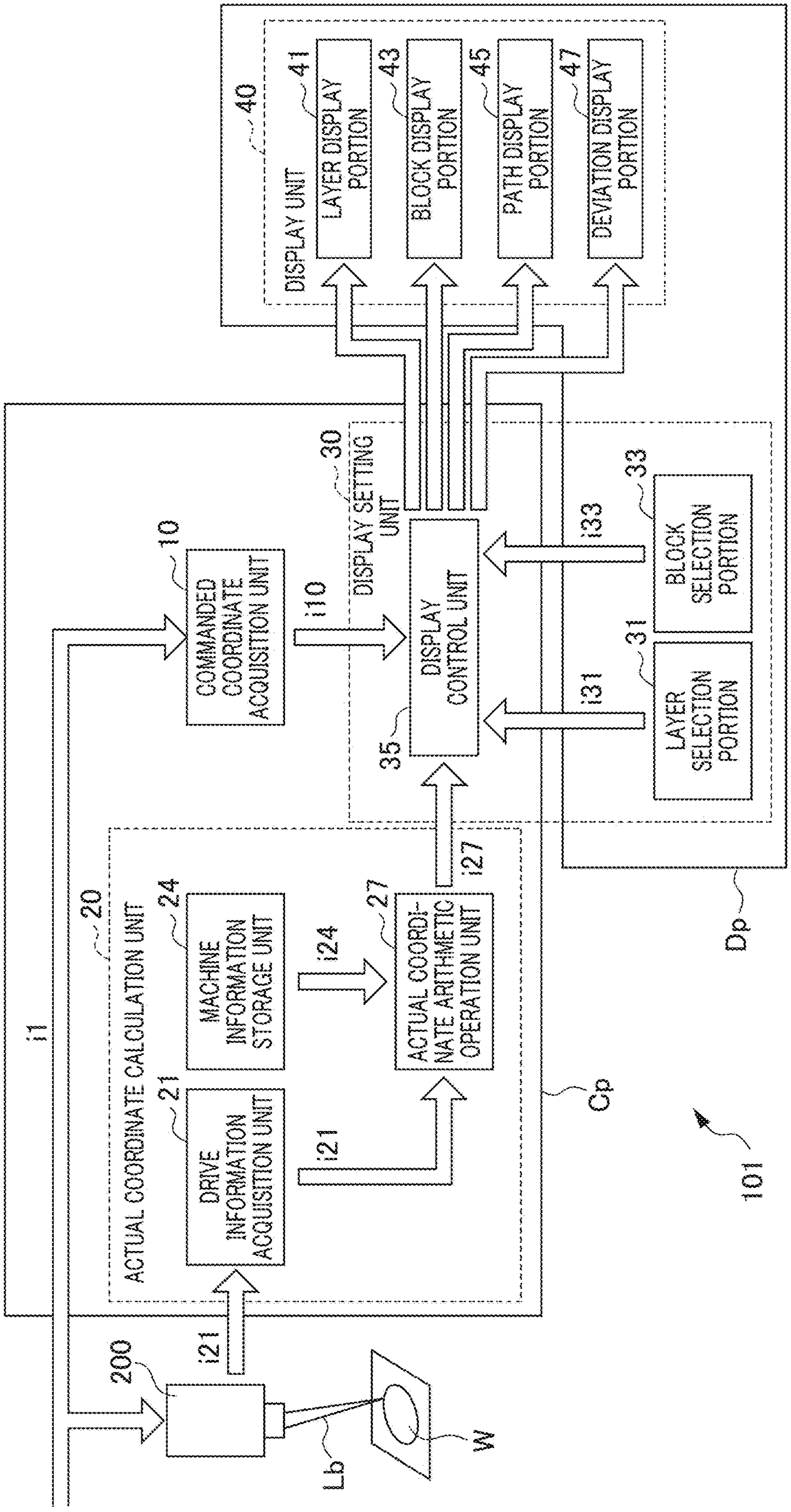
FIG. 3 is a block diagram showing a laser path display apparatus.

As shown in FIG. 3, the laser path display apparatus 101 is configured mainly with a computer Cp and a display Dp. The computer Cp is provided, for example, with memory such as ROM (read-only memory) and RAM (random access memory), a CPU (control processing unit), a communication control unit, and the like which are mutually connected via a bus. By a laser path display program P to be described later being executed by the computer Cp, that is, by cooperation between the computer Cp and the laser path display program P, the computer Cp and the display Dp function as a commanded coordinate acquisition unit 10, an actual coordinate calculation unit 20, a display setting unit 30, and a display unit 40. In other words, the laser path display apparatus 101 has the commanded coordinate acquisition unit 10, the actual coordinate calculation unit 20, the display setting unit 30, and the display unit 40.

First, the commanded coordinate acquisition unit 10 and the actual coordinate calculation unit 20 will be described. The commanded coordinate acquisition unit 10 and the actual coordinate calculation unit 20 are configured mainly with the computer Cp.

The commanded coordinate acquisition unit 10 acquires "command information i1" as information showing operation commands to the mirror drive devices 210, from a control device or the like of the galvanometer scanner 200. Based on the command information i1, the commanded coordinate acquisition unit 10 transmits "commanded coordinate information i10" as information showing the commanded coordinates for the laser light LB, to the display setting unit 30 based on the command information i1.

The actual coordinate calculation unit 20 has a drive information acquisition unit 21, a machine information storage unit 24, and an actual coordinate arithmetic operation unit 27. The drive information acquisition unit 21 acquires "drive information i21" as information showing states of drive of the mirrors 220 by the mirror drive devices 210, from the galvanometer scanner 200, and transmits the drive information i21 to the actual coordinate arithmetic operation unit 27.

The machine information storage unit 24 stores "machine information i24" showing a relationship between the drive information i21 and the actual coordinates of the laser light LB, for each of a plurality of galvanometer scanner models. The machine information storage unit 24 recognizes the model of the galvanometer scanner 200 connected thereto, for example, from wiring and the like, and transmits the machine information i24 about the model to the actual coordinate arithmetic operation unit 27.

The actual coordinate arithmetic operation unit 27 calculates the actual coordinates of the laser light LB, based on the received drive information i21 and the received machine information i24. The actual coordinate arithmetic operation unit 27 transmits "actual coordinate information i27" as information showing the actual coordinates, to the display setting unit 30.

Next, the display setting unit 30 and the display unit 40 will be described. The display setting unit 30 has a layer selection portion 31, a block selection portion 33, and a display control unit 35. The display unit 40 has a layer display portion 41, a block display portion 43, a path display portion 45, and a deviation display portion 47.

The display control unit 35 is configured mainly with the computer Cp. The layer selection portion 31 and the block selection portion 33 are configured mainly with the display Dp and operation tools. The operation tools are, for example, a mouse, a keyboard, a touch pad, a touch panel, and the like. The portions of the display unit 40, that is, the layer display portion 41, the block display portion 43, the path display portion 45, and the deviation display portion 47 are configured mainly with the display Dp.

A user can select an arbitrary layer L of the layered structure S as a display layer Ld with the layer selection portion 31. Here, "selected layer information i31" as information showing the selected layer L is transmitted to the display control unit 35.

The display layer Ld is divided into a plurality of blocks B for convenience. The user can select an arbitrary block B of the display layer Ld as a display block Bd with the block selection portion 33. Here, "selected block information i33" as information showing the selected block B is transmitted to the display control unit 35.

The display control unit 35 causes the layer display portion 41 to display information showing which of the layers L of the layered structure S the display layer Ld is, based on the received selected layer information i31. Furthermore, the display control unit 35 causes the block display portion 43 to display information showing which of the blocks B of the display layer Ld the display block Bd is, based on the received selected block information i33.

Furthermore, the display control unit 35 causes the path display portion 45 to display the commanded laser path T1 for the display block Bd of the display layer Ld, based on the received selected layer information i31, the received selected block information i33, and a history of the received commanded coordinate information i10.

Further, the display control unit 35 causes the path display portion 45 to display the actual laser path T2 for the display block Bd of the display layer Ld, based on the received selected layer information i31, the received selected block information i33, and the history of the received actual coordinate information i27.

Hereinafter, a deviation of the actual coordinates of the laser light LB relative to the commanded coordinates for the laser light LB will be referred to as an "actual coordinate deviation". Furthermore, the display control unit 35 calculates an actual coordinate deviation for the display block Bd of the display layer Ld, based on the received selected layer information i31, the received selected block information i33, a history of the received commanded coordinate information i10, and the history of the received actual coordinate information i27. In the display block Bd of the display layer Ld, the greater the difference between the commanded coordinates for the laser light LB and the actual coordinates of the laser light LB is as a whole, the more the actual coordinate deviation increases. The display control unit 35 causes the deviation display portion 47 to display information showing the calculated actual coordinate deviation.

Figure 4:
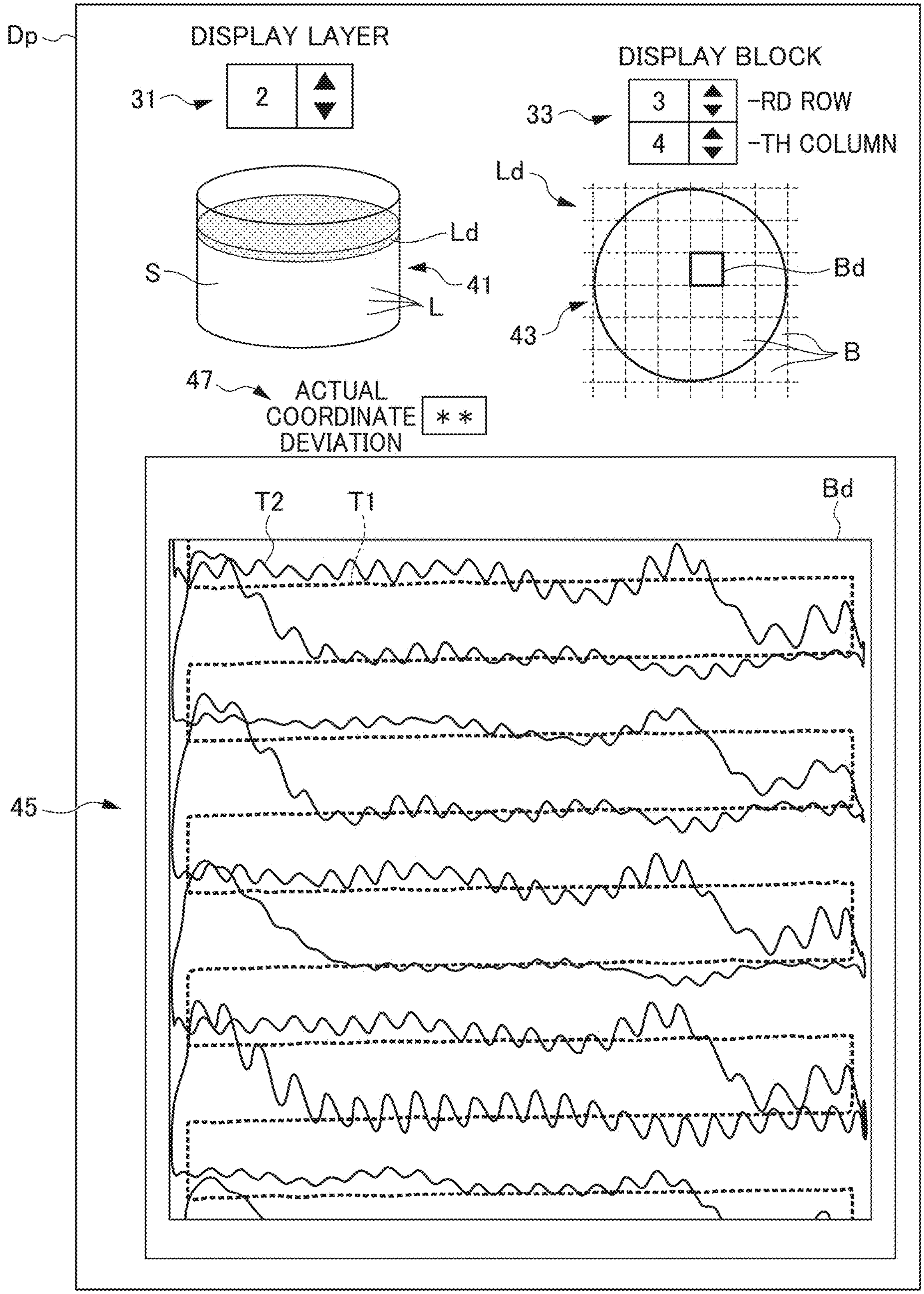
FIG. 4 is a diagram showing an example of a screen displayed on a display.

Like an example of a screen of the display Dp shown in FIG. 4, the layer selection portion 31, the layer display portion 41, the block selection portion 33, the block display portion 43, the path display portion 45, and the deviation display portion 47 are formed in the display Dp.

The user selects the display layer Ld, for example, by inputting a number of a layer L to the layer selection portion 31. When the display layer Ld is selected, for example, a position of the display layer Ld in the layered structure S is shown on the layer display portion 41.

The user selects the display block Bd of the display layer Ld, for example, by inputting a row number and a column number to the block selection portion 33. When the display block Bd is selected, for example, a position of the display block Bd of the display layer Ld is shown on the block display portion 43.

For the display block Bd of the display layer Ld, the path display portion 45 overlappingly displays the commanded laser path T1 and the actual laser path T2 in mutually different colors. Though the commanded laser path T1 and the actual laser path T2 are shown as lines of mutually different types in FIG. 4 in order to indicate color difference, the line types may be the same or may be different from each other. For example, it is seen from FIG. 4 that a deviation of the actual laser path T2 relative to the commanded laser path T1 is large at parts where the commanded laser path T1 turns back. That is, it is seen that the actual laser path T2 is disrupted at the parts of turning back. As the cause thereof, overshoot or the like due to feedback control for response delay of the mirror drive devices 210 is conceivable.

The deviation display portion 47 displays the actual coordinate deviation for the display block Bd of the display layer Ld, for example, as a numeral, a bar graph, a gauge, or the like.

Figure 5:
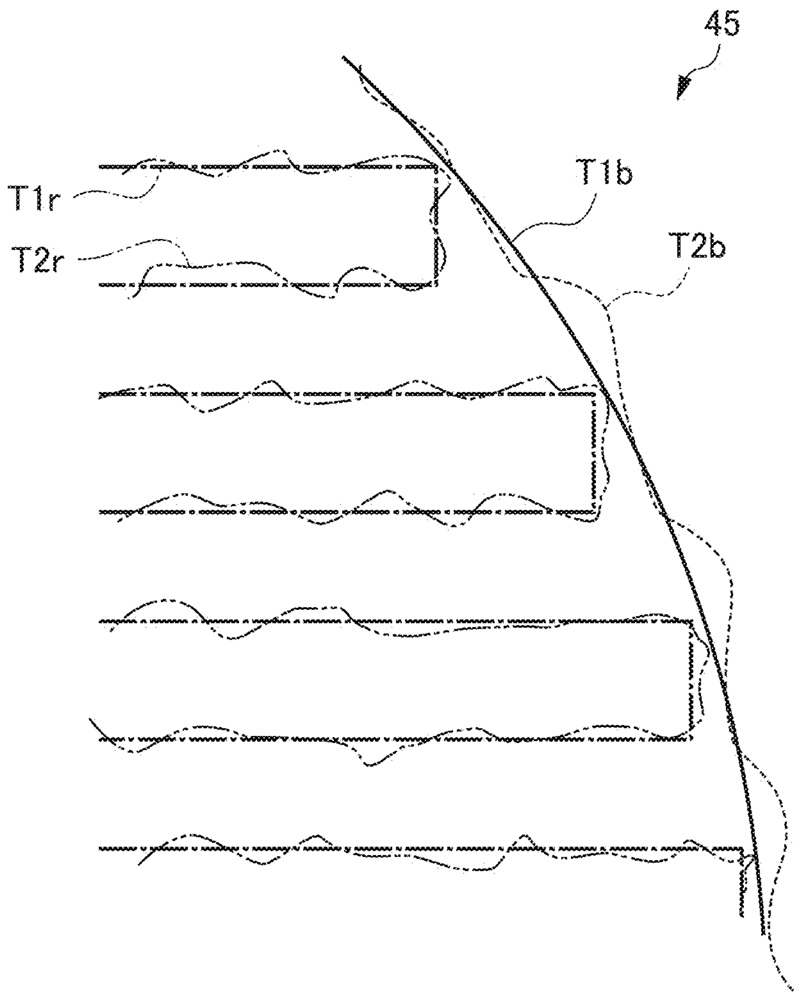
FIG. 5 is a diagram showing the edge of a layer of a layered structure.

FIG. 5 shows a part of the path display portion 45 in a case where a block B at the edge of the layer L is selected as the display block Bd. As for the edge of each layer L, the galvanometer scanner 200 forms a shape by vector operation based on information in a vector format. As for a part inside the edge of each layer L, the galvanometer scanner 200 forms a shape by raster operation based on information in a raster format.

In addition to displaying the commanded laser path T1 and the actual laser path T2 in mutually different colors, the path display portion 45 displays, for the actual laser path T2, an actual laser path T2*b* by vector operation and an actual laser path T2*r* by raster operation in mutually different colors.

As for the commanded laser path T1, when it is not confusing even if a commanded laser path T1*b* by vector operation and a commanded laser path T1*r* by raster operation are displayed in the same color, they may be displayed in the same color. When it is confusing if they are displayed in the same color, however, it is preferred to display them in mutually different colors.

Figure 6:
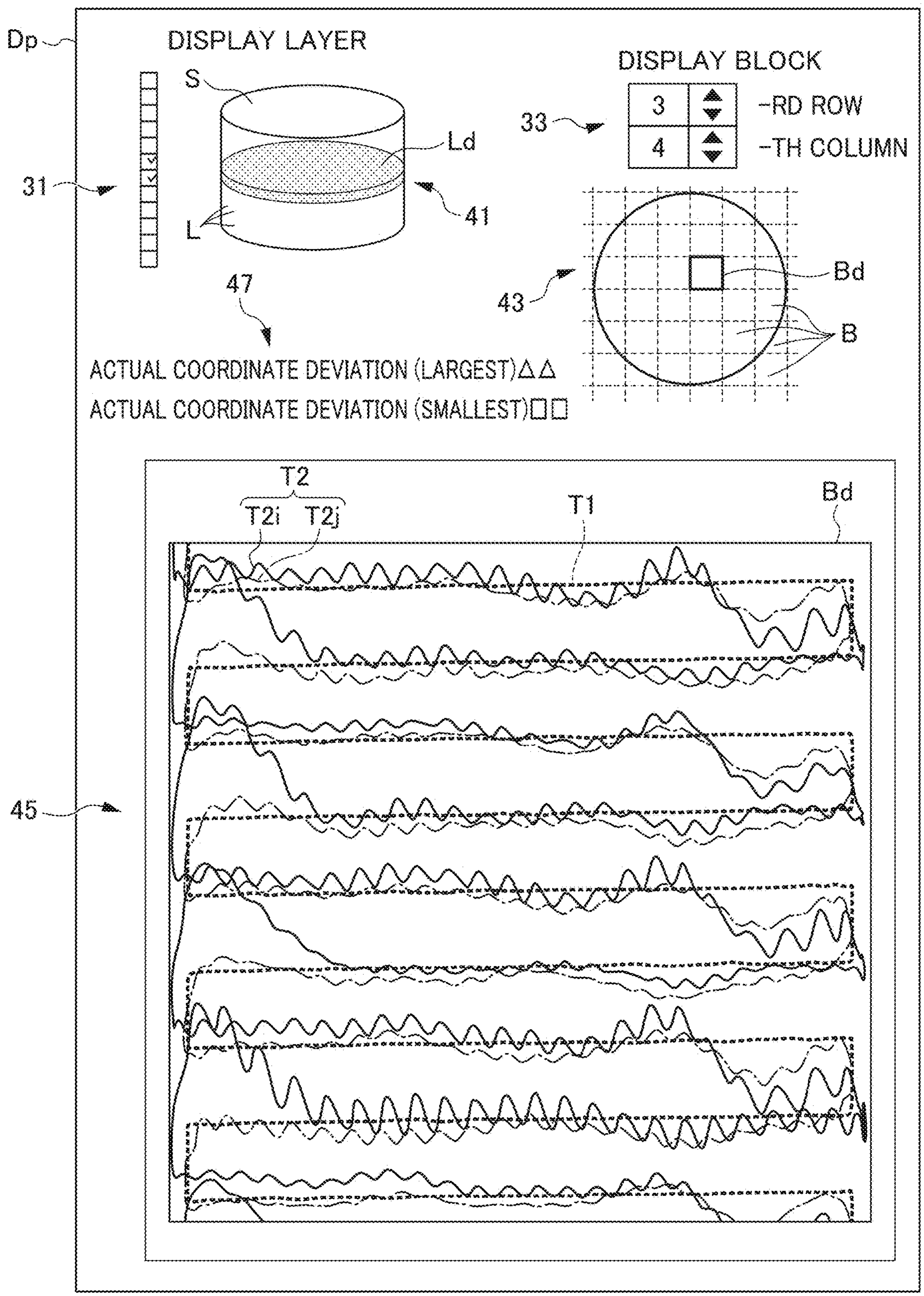
FIG. 6 is a diagram showing another example of the screen.

Like another example of the screen shown in FIG. 6, the layer selection portion 31 may be configured such that a plurality of layers can be selected as display layers Ld. The display layers Ld may be selected by checking some cells among a plurality of cells corresponding to the layers L of the layered structure S as shown in the figure.

When a plurality of layers L are selected as the display layers Ld, the path display portion 45 displays actual laser paths T2*i* and T2*j* of different layers L in mutually different colors, in addition to displaying the commanded laser path T1 and the actual laser path T2 in mutually different colors. As for the commanded laser paths T1 and T1 of mutually different layers L, they may be displayed in the same color when they completely overlap with each other as shown in FIG. 6 or when it is not confusing even if they are displayed in the same color. When it is confusing if they are displayed in the same color, however, it is preferred to display them in mutually different colors.

When a plurality of layers L are selected as the display layers Ld, the deviation display portion 47 displays, for example, actual coordinate deviations of a display layer Ld with the largest actual coordinate deviation for the display block Bd and a display layer Ld with the smallest actual coordinate deviation for the display block Bd among the plurality of display layers Ld. Instead, however, actual coordinate deviations may be displayed, for example, for the display blocks Bd of all the display layers Ld.

Figure 7:
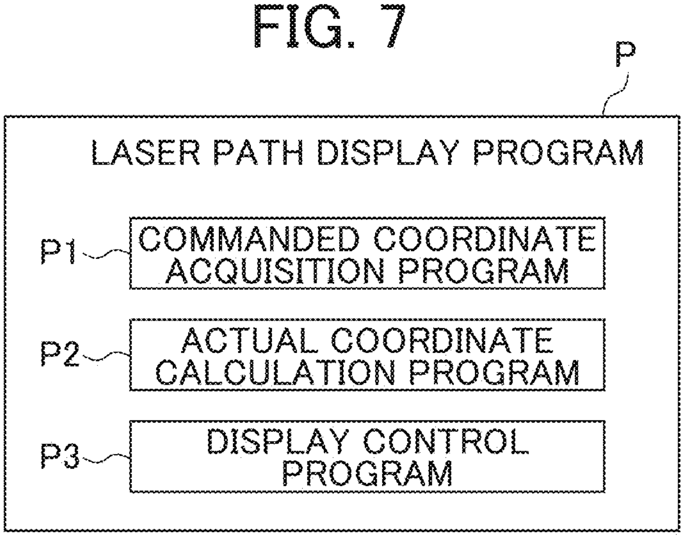
FIG. 7 is a configuration diagram showing a laser path display program.

As shown in FIG. 7, the laser path display program P has a commanded coordinate acquisition program P1 for causing the computer Cp to function as the commanded coordinate acquisition unit 10, an actual coordinate calculation program P2 for causing the computer Cp to function as the actual coordinate calculation unit 20, and a display control program P3 for causing the computer Cp to function as the display control unit 35.

Effects of the present embodiment will be summarized below.

The display setting unit 30 sets a part of the layers L of the layered structure S as the display layers Ld. The path display portion 45 overlappingly displays the commanded laser path T1 and the actual laser path T2 for the display layer sets Ld. Therefore, it is possible to, for each of the part of the layers, overlappingly display the commanded laser path T1 and the actual laser path T2. Therefore, the user can easily visually confirm a deviation of the actual laser path T2 relative to the commanded laser path T1 on the same layer L and can recognize disruption of the actual laser path T2 based on the deviation. Therefore, the user can efficiently investigate the disruption of the actual laser path T2.

The path display portion 45 displays the commanded laser path T1 and the actual laser path T2 in mutually different colors. Therefore, the user can more easily visually confirm the deviation of the actual laser path T2 relative to the commanded laser path T1.

The display control unit 35 sets, for example, only one layer of the layered structure S as the display layer Ld. In this case, the commanded laser paths T1 and T1 of a plurality of layers L or the actual laser paths T2 and T2 of a plurality of layers L do not mutually overlap. Therefore, the user can more easily visually confirm the deviation of the actual laser path T2 relative to the commanded laser path T1 on the same layer.

The display setting unit 30 has the layer selection portion 31 that enables the user to select the display layer Ld. Therefore, the user can select a desired layer L of the layered structure S as the display layer Ld with the layer selection portion 31. Moreover, the user can investigate a plurality of layers L in turn by switching the display layer Ld. Therefore, the user can efficiently investigate the plurality of layers L in turn from a desired layer L.

The display layer Ld is divided into the plurality of blocks B. The display setting unit 30 sets a part of the blocks B of the display layer Ld as the display blocks Bd. The path display portion 45 overlappingly displays the commanded laser path T1 and the actual laser path T2 for the blocks Bd of the display layer Ld. By narrowing a display range to a part of the display layer Ld as above, it becomes easier for the user to visually confirm the disruption of the actual laser path T2 in the display blocks Bd.

The display setting unit 30 has the block selection portion 33 that enables the user to select the display block Bd. Therefore, the user can select a desired block B of the display layer Ld as the display block Bd with the block selection portion 33. Moreover, the user can investigate a plurality of blocks B in turn by switching the display block Bd. Therefore, the user can efficiently investigate the plurality of blocks B in turn from a desired block B.

The galvanometer scanner 200 forms the layered structure S by vector operation based on information in a vector format and raster operation based on information in a raster format. The path display portion 45 displays the actual laser path T2*b* in the vector operation and the actual laser path T2*r* in the raster operation in mutually different colors. Therefore, it is easy for the user to identify the actual laser path T2*b* in the vector operation and the actual laser path T2*r* in the raster operation. Therefore, the user can efficiently investigate disruption of the actual laser path T2*b* in the vector operation and disruption of the actual laser path T2*r* in the raster operation.

The drive information acquisition unit 21 acquires the drive information i21 as the information showing states of the mirror drive devices 210. The machine information storage unit 24 stores the machine information i24 showing the relationship between the drive information i21 and the actual coordinates of the laser light LB, for each of a plurality of galvanometer scanner models. The actual coordinate arithmetic operation unit 27 calculates the actual coordinates of the laser light LB based on the drive information i21 acquired and the machine information i24 about the model of the galvanometer scanner 200 corresponding to the drive information i21. Therefore, the laser path display apparatus 101 can be compatible with a plurality of models of the galvanometer scanner 200.

For the display layer Ld, the deviation display portion 47 displays information showing an actual coordinate deviation, which is a deviation of the actual coordinates of the laser light LB relative to the commanded coordinates for the laser light LB. Therefore, the user can estimate whether disruption of the actual laser path T2 in the current display layer Ld is significant or not, based on the information displayed on the deviation display portion 47.

The layer display portion 41 displays information showing which layer L of the layered structure S the display layer Ld is. Therefore, the user can recognize which layer L of the layered structure S the current display layer Ld is, based on the information displayed on the layer display portion 41.

The block display portion 43 displays information showing which block B of the display layer Ld the display block Bd is. Therefore, the user can recognize which block B of the display layer Ld the current display block Bd is, based on the information displayed on the block display portion 43.

The laser path display program P causes the computer Cp to function as the commanded coordinate acquisition unit 10, the actual coordinate calculation unit 20, and the display control unit 35 and causes, for a set display layer Ld, the display Dp of the computer Cp to overlappingly display the commanded laser path T1 and the actual laser path T2. Therefore, it is possible to realize the laser path display apparatus 101 using the computer Cp and the display Dp without providing a dedicated laser path display apparatus 101.

Second Embodiment

Next, a second embodiment will be described. In the present embodiment, description will be made mainly on points different from the first embodiment, based on the first embodiment, and description of points that are the same as or similar to the first embodiment will be appropriately omitted.

Figure 8:
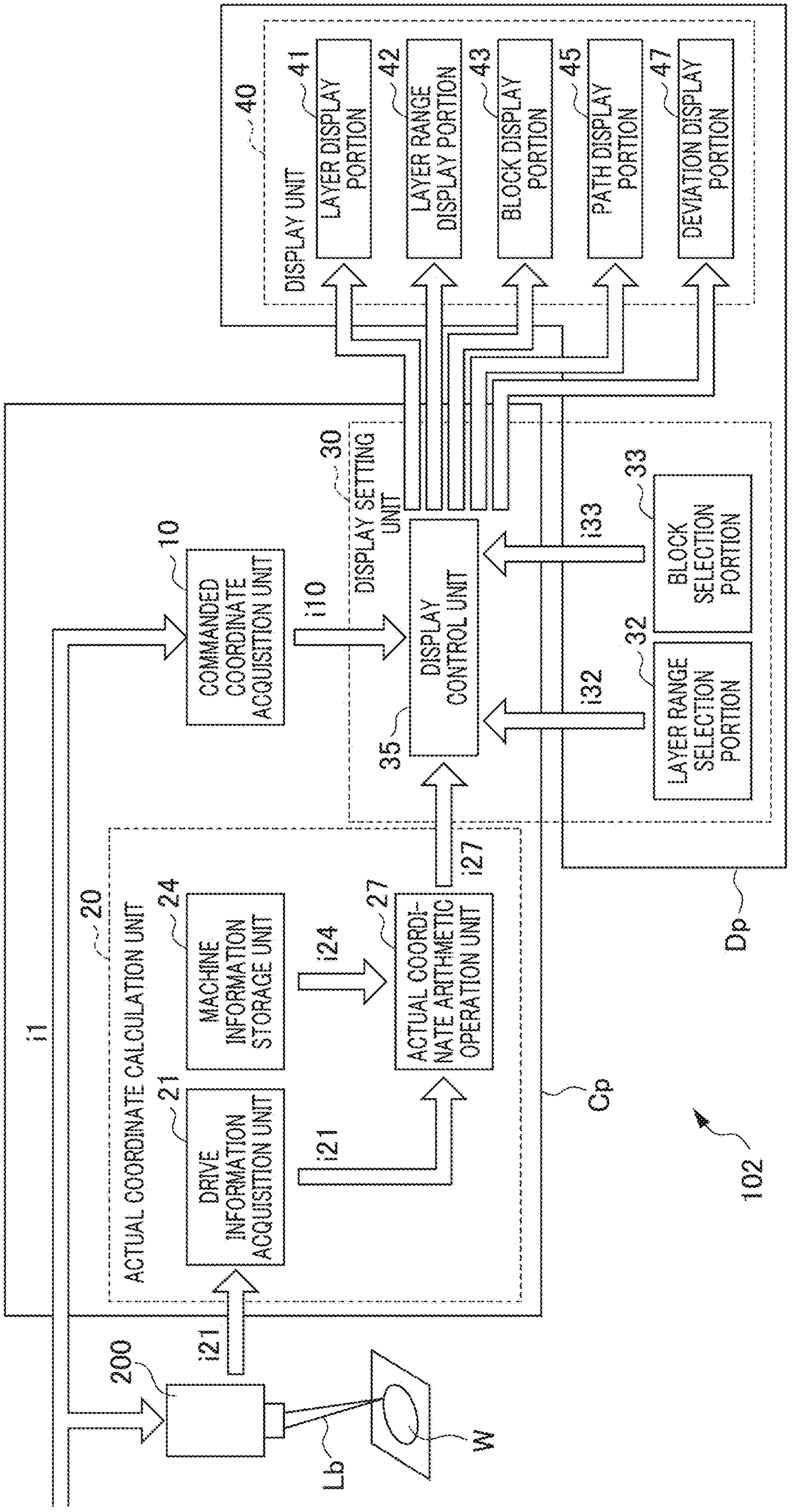
FIG. 8 is a block diagram showing a laser path display apparatus of a second embodiment.

As shown in FIG. 8, the display setting unit 30 of a laser path display apparatus 102 of the present embodiment does not have the layer selection portion 31 and has a layer range selection portion 32 instead. Further, the display unit 40 further has a layer range display portion 42. The layer range selection portion 32 is configured mainly with the display Dp and the operation tools. The layer range display portion 42 is configured mainly with the display Dp.

The user can select an arbitrary layer range in the layered structure S as a target range with the layer range selection portion 32. Layer range information i32 showing the selected layer range is transmitted to the display control unit 35. It is, however, also possible to set the selection of the target range with the layer range selection portion 32 to OFF. If the selection is set to OFF, all the layers L of the layered structure S are set as the target range.

The display control unit 35 causes the layer range display portion 42 to display information showing which range in the layered structure S the target range is, based on the layer range information i32. Further, the display control unit 35 calculates an actual coordinate deviation for the display block Bd, for each of layers L within the target range. The display layer Ld is selected based on the deviation. Specifically, among the layers L in the target range, a layer L with the largest actual coordinate deviation for the display block Bd is selected as the display layer Ld. The process after that is similar to that of the first embodiment.

Figure 9:
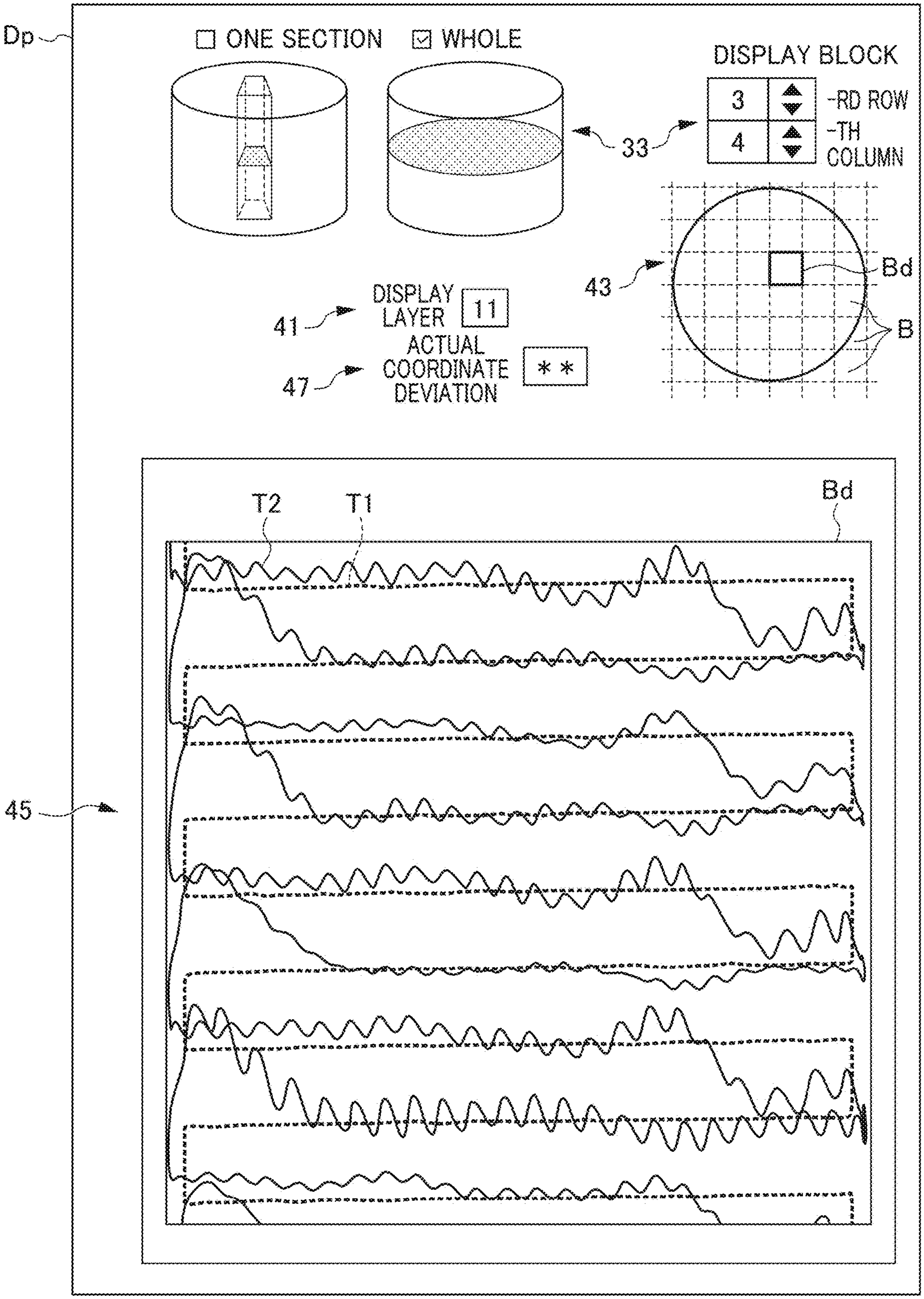
FIG. 9 is a diagram showing an example of a screen displayed on a display.

In an example of the screen of the display Dp shown in FIG. 9, the selection of the target range with the layer range selection portion 32 is set to OFF, and all the layers L of the layered structure S are set as the target range. In this case, the layer range selection portion 32 and the layer range display portion 42 are not formed in the display Dp. That is, in the display Dp, the layer display portion 41, the block selection portion 33, the block display portion 43, the path display portion 45, and the deviation display portion 47 are formed.

In the example of FIG. 9, the user can switch ON/OFF of the selection of the display block Bd itself with the block selection portion 33. Specifically, for example, in the case of setting the selection of the display block Bd to OFF, "one section" is selected on a left part of the block selection portion 33 shown in FIG. 9. Thereby, a predetermined one section in the layers L, such as a central part, becomes the display block Bd. On the other hand, in the case of setting the selection of the display block Bd to ON, a desired block B is selected as the display block Bd by selecting "whole" on the left part of the block selection portion 33 shown in FIG. 9 and then inputting a row number and a column number on a right part of the block selection portion 33.

When the display block Bd is selected, a layer with the largest actual coordinate deviation for the display block Bd, among the layers L in the target range, that is, among all the layers L of the layered structure S here is selected as the display layer Ld. On the layer display portion 41, for example, a number indicating the layer is displayed as information showing the display layer Ld. On the path display portion 45, the commanded laser path T1 and the actual laser path T2 are overlappingly displayed in mutually different colors for the display block Bd of the display layer Ld similarly to the case of the first embodiment.

Figure 10:
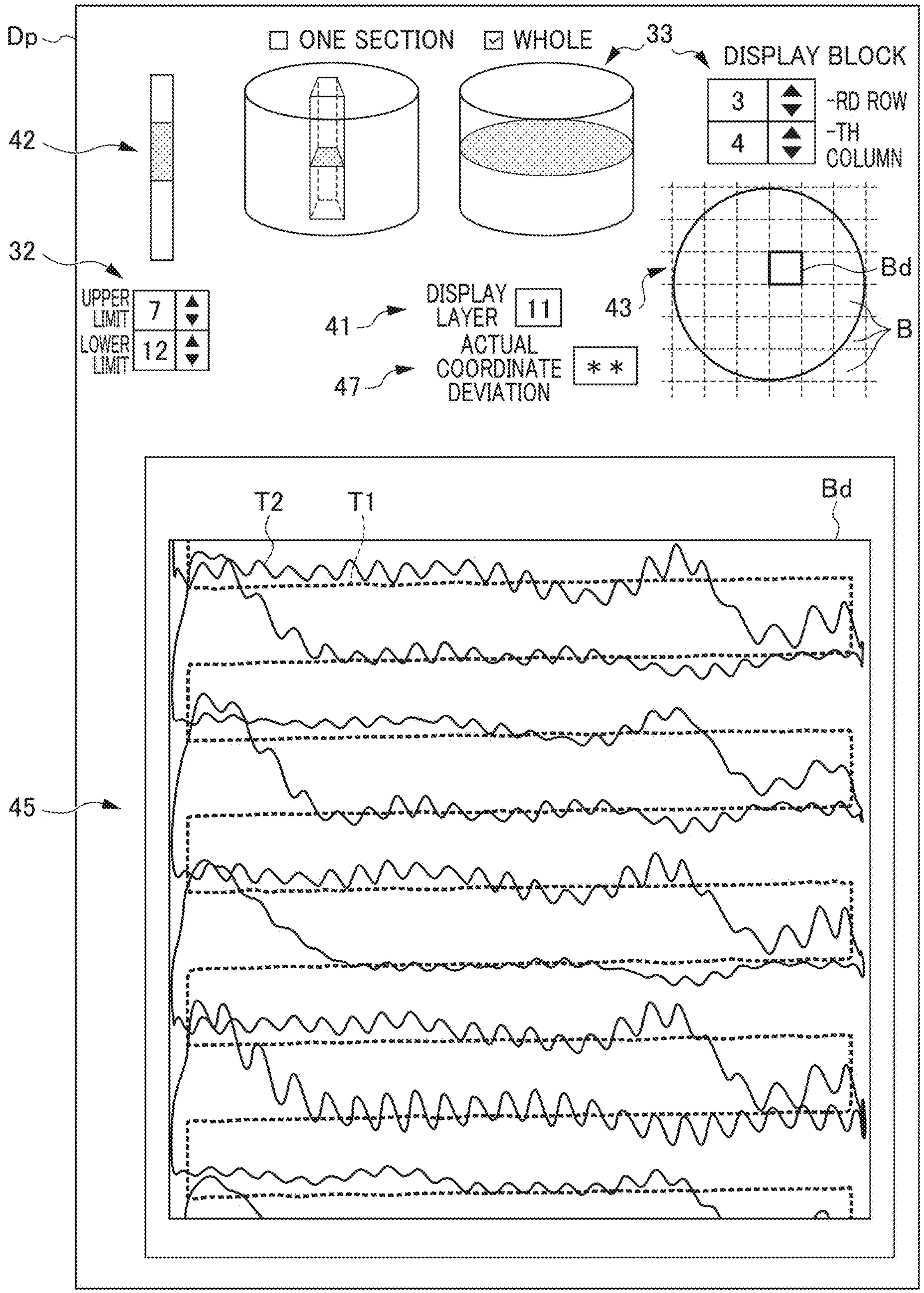
FIG. 10 is a diagram showing another example of the screen.

In another example of the screen shown in FIG. 10, the selection of the target range with the layer range selection portion 32 is set to ON. In this case, the layer range selection portion 32 and the layer range display portion 42 are further formed in the display Dp.

The user selects the target range, for example, by inputting the upper-limit number and the lower-limit number of layers L to the layer range selection portion 32. When the target range is selected, for example, a position and range of the target range in the layered structure S are shown on the layer range display portion 42 as information showing the target range. Then, a layer with the largest actual coordinate deviation for the display block Bd is the largest in the target range is selected as the display layer Ld. On the layer display portion 41, for example, a number representing a layer is displayed as the information showing the display layer Ld. On the path display portion 45, the commanded laser path T1 and the actual laser path T2 are overlappingly displayed in mutually different colors for the display block Bd of the display layer Ld similarly to the case of FIG. 9.

The configuration and effects of the present embodiment will be summarized below.

There is a strong possibility that a layer L with a large actual coordinate deviation, a layer L with an actual coordinate deviation that is large in comparison with layers L therearound, or the like has a problem of disruption of the actual laser path T2. In this regard, the display setting unit 30 calculates an actual coordinate deviation for each layer L of the layered structure S and selects the display layer Ld based on the actual coordinate deviations. Therefore, a layer L where the possibility of the problem of disruption of the actual laser path T2 is high is automatically selected as the display layer Ld. Therefore, the user can efficiently investigate a layer L where the possibility of the problem is high.

Specifically, in a layer L with the largest actual coordinate deviation, there is a strong possibility that the actual laser path T2 is significantly disrupted. In this regard, the display setting unit 30 selects a layer L with the largest actual coordinate deviation among layers L within the target range in the layered structure S, as the display layer Ld. Therefore, a layer L where there is a strong possibility that the actual laser path T2 is significantly disrupted is automatically selected as the display layer Ld.

The display setting unit 30 has the layer range selection portion 32 that enables the user to select the target range. Therefore, the user can select a desired layer range in the layered structure S as the target range with the layer range selection portion 32. Moreover, the user can investigate a plurality of target ranges in turn by switching the target range. Therefore, the user can efficiently investigate the plurality of target ranges in turn from a desired target range.

Other Embodiments

The embodiments shown above can be changed, for example, as follows. The actual coordinate calculation unit 20 may calculate the actual coordinates of the laser light LB based on states of the mirrors 220 themselves instead of or in addition to states of the mirror drive devices 210. Instead of causing the computer Cp and the display Dp, and the like to function as the laser path display apparatus 101 or 102 by the laser path display program P, a dedicated laser path display apparatus 101 or 102 may be provided.

EXPLANATION OF REFERENCE NUMERALS

10: commanded coordinate acquisition unit
20: actual coordinate calculation unit
21: drive information acquisition unit
24: machine information storage unit
27: actual coordinate arithmetic operation unit
30: display setting unit
31: layer selection portion
32: layer range selection portion
33: block selection portion
35: display control unit
40: display unit
41: layer display portion
42: layer range display portion
43: block display portion
45: path display portion
47: deviation display portion
101: laser path display apparatus of first embodiment
102: laser path display apparatus of second embodiment
200: galvanometer scanner
210: mirror drive device
220: mirror
T1: commanded laser path
T1*b*: commanded laser path in vector operation
T1*r*: commanded laser path in raster operation
T2: actual laser path
T2*b*: actual laser path in vector operation
T2*r*: actual laser path in raster operation
LB: laser light
W: workpiece

The invention claimed is:

1. A laser path display apparatus installed for a galvanometer scanner, the galvanometer scanner comprising mirrors and mirror drive devices driving the mirrors, and forming a layered structure on a workpiece with laser light reflected by the mirrors, the laser path display apparatus comprising:

a commanded coordinate acquisition unit acquiring commanded coordinates of the laser light relative to the workpiece, based on command information to the mirror drive devices;

an actual coordinate calculation unit calculating actual coordinates of the laser light relative to the workpiece, based on a state of at least either the mirrors or the mirror drive devices;

a display setting unit setting one or more layers of the layered structure as a display layer; and a path display portion overlappingly displaying, for the display layer being set, a commanded laser path as a path based on a history of the commanded coordinates acquired and an actual laser path as a path based on a history of the actual coordinates calculated, wherein the display layer is divided into a plurality of blocks;

the display setting unit sets one or more the blocks of the display layer as a display block; and the path display portion overlappingly displays, for the display block of the display layer, the commanded laser path and the actual laser path.

2. The laser path display apparatus according to claim 1, wherein the path display portion displays the commanded laser path and the actual laser path in mutually different colors.

3. The laser path display apparatus according to claim 1, wherein the display setting unit sets only one layer of the layered structure as the display layer.

4. The laser path display apparatus according to claim 1, wherein the display setting unit comprises a layer selection portion enabling a user to select the display layer.

5. The laser path display apparatus according to claim 1, wherein the display setting unit comprises a block selection portion enabling the user to select the display block.

6. The laser path display apparatus according to claim 1, wherein the display setting unit calculates a deviation of the actual coordinates relative to the commanded coordinates for each of the layers of the layered structure and selects the display layer based on the deviation.

7. The laser path display apparatus according to claim 1, wherein the galvanometer scanner forms the layered structure by vector operation based on information in a vector format and raster operation based on information in a raster format; and the path display portion displays the actual laser path in the vector operation and the actual laser path in the raster operation in mutually different colors.

8. The laser path display apparatus according to claim 1, wherein the actual coordinate calculation unit comprises:

a drive information acquisition unit acquiring drive information as information showing states of the mirror drive devices;

a machine information storage unit storing machine information showing a relationship between the drive information and the actual coordinates, for each of a plurality of galvanometer scanner models; and an actual coordinate arithmetic operation unit calculating the actual coordinates based on the drive information acquired and the machine information about a model of the galvanometer scanner corresponding to the drive information.

9. The laser path display apparatus according to claim 1, comprising a deviation display portion displaying, for the display layer, information showing a deviation of the actual coordinates relative to the commanded coordinates.

10. The laser path display apparatus according to claim 1, comprising a layer display portion displaying information showing which of the layers of the layered structure the display layer is.

11. The laser path display apparatus according to claim 1, wherein the display layer is divided into a plurality of blocks;

the display setting unit sets one or more the blocks of the display layer as a display block;

the path display portion overlappingly displays, for the display block of the display layer, the commanded laser path and the actual laser path; and the laser path display apparatus comprises a block display portion displaying information showing which of the blocks of the display layer the display block is.

12. A laser path display apparatus installed for a galvanometer scanner, the galvanometer scanner comprising mirrors and mirror drive devices driving the mirrors, and forming a layered structure on a workpiece with laser light reflected by the mirrors, the laser path display apparatus comprising:

a commanded coordinate acquisition unit acquiring commanded coordinates of the laser light relative to the workpiece, based on command information to the mirror drive devices;

an actual coordinate calculation unit calculating actual coordinates of the laser light relative to the workpiece, based on a state of at least either the mirrors or the mirror drive devices;

a display setting unit setting one or more layers of the layered structure as a display layer; and a path display portion overlappingly displaying, for the display layer being set, a commanded laser path as a path based on a history of the commanded coordinates acquired and an actual laser path as a path based on a history of the actual coordinates calculated, wherein the display setting unit calculates a deviation of the actual coordinates relative to the commanded coordinates for each of the layers of the layered structure and selects the display layer based on the deviation.

13. The laser path display apparatus according to claim 12, wherein the display setting unit selects a layer with a largest deviation among layers within a target range in the layered structure as the display layer.

14. The laser path display apparatus according to claim 13, wherein the display setting unit comprises a layer range selection portion enabling the user to select the target range.

15. The laser path display apparatus according to claim 12, wherein the actual coordinate calculation unit comprises:

a drive information acquisition unit acquiring drive information as information showing states of the mirror drive devices;

a machine information storage unit storing machine information showing a relationship between the drive information and the actual coordinates, for each of a plurality of galvanometer scanner models; and an actual coordinate arithmetic operation unit calculating the actual coordinates based on the drive information acquired and the machine information about a model of the galvanometer scanner corresponding to the drive information.

16. The laser path display apparatus according to claim 12, wherein the display layer is divided into a plurality of blocks;

the display setting unit sets one or more the blocks of the display layer as a display block;

the path display portion overlappingly displays, for the display block of the display layer, the commanded laser path and the actual laser path; and the laser path display apparatus comprises a block display portion displaying information showing which of the blocks of the display layer the display block is.

17. A laser path display apparatus installed for a galvanometer scanner, the galvanometer scanner comprising mirrors and mirror drive devices driving the mirrors, and forming a layered structure on a workpiece with laser light reflected by the mirrors, the laser path display apparatus comprising:

a commanded coordinate acquisition unit acquiring commanded coordinates of the laser light relative to the workpiece, based on command information to the mirror drive devices;

an actual coordinate calculation unit calculating actual coordinates of the laser light relative to the workpiece, based on a state of at least either the mirrors or the mirror drive devices;

a display setting unit setting one or more layers of the layered structure as a display layer; and a path display portion overlappingly displaying, for the display layer being set, a commanded laser path as a path based on a history of the commanded coordinates acquired and an actual laser path as a path based on a history of the actual coordinates calculated, wherein the galvanometer scanner forms the layered structure by vector operation based on information in a vector format and raster operation based on information in a raster format; and the path display portion displays the actual laser path in the vector operation and the actual laser path in the raster operation in mutually different colors.

18. The laser path display apparatus according to claim 17, wherein the actual coordinate calculation unit comprises:

a drive information acquisition unit acquiring drive information as information showing states of the mirror drive devices;

a machine information storage unit storing machine information showing a relationship between the drive information and the actual coordinates, for each of a plurality of galvanometer scanner models; and an actual coordinate arithmetic operation unit calculating the actual coordinates based on the drive information acquired and the machine information about a model of the galvanometer scanner corresponding to the drive information.

19. The laser path display apparatus according to claim 17, wherein the display layer is divided into a plurality of blocks;

the display setting unit sets one or more the blocks of the display layer as a display block;

the path display portion overlappingly displays, for the display block of the display layer, the commanded laser path and the actual laser path; and the laser path display apparatus comprises a block display portion displaying information showing which of the blocks of the display layer the display block is.

* * * * *